Oct. 9, 1962 M. H. KUHNER 3,057,333
STEAM SEPARATOR
Filed April 22, 1958 3 Sheets-Sheet 1

INVENTOR.
Max H. Kuhner
BY
Norman S. Blodgett
Attorney

United States Patent Office 3,057,333
Patented Oct. 9, 1962

3,057,333
STEAM SEPARATOR
Max H. Kuhner, Worcester, Mass., assignor to Riley Stoker Corporation, Worcester, Mass., a corporation of Massachusetts
Filed Apr. 22, 1958, Ser. No. 730,225
4 Claims. (Cl. 122—491)

This invention relates to a steam separator, and more particularly to apparatus for removing suspended particles of water or the like from the steam emanating from a steam generating unit, particularly one of the nuclear reactor type.

In the design of compact steam generating units, and particularly those of the nuclear reactor type, it is necessary to purify the steam generated by the apparatus in a small and confined space. In the past with larger steam generating units, this function has been performed in the so-called steam-and-water drum where considerable space was available over the normal water level to purify the steam. The arrangement of steam purifying elements normally used with the prior art steam generating units do not function efficiently in the small space available in the drum of a nuclear reactor where, because of the high pressures and temperatures being used and the contaminated nature of the steam, the entire steam generating unit must be confined in a relatively small, ruggedly-built drum. These and other difficulties experienced with the prior art devices have been obviated in a novel manner by the present invention.

It is, therefore, an outstanding object of the present invention to provide a steam separator capable of efficient operation in a small space.

Another object of this invention is the provision of a steam purifying apparatus having an unusual arrangement of separator elements to make optimum use of space available for the purifying function.

Figure 1:
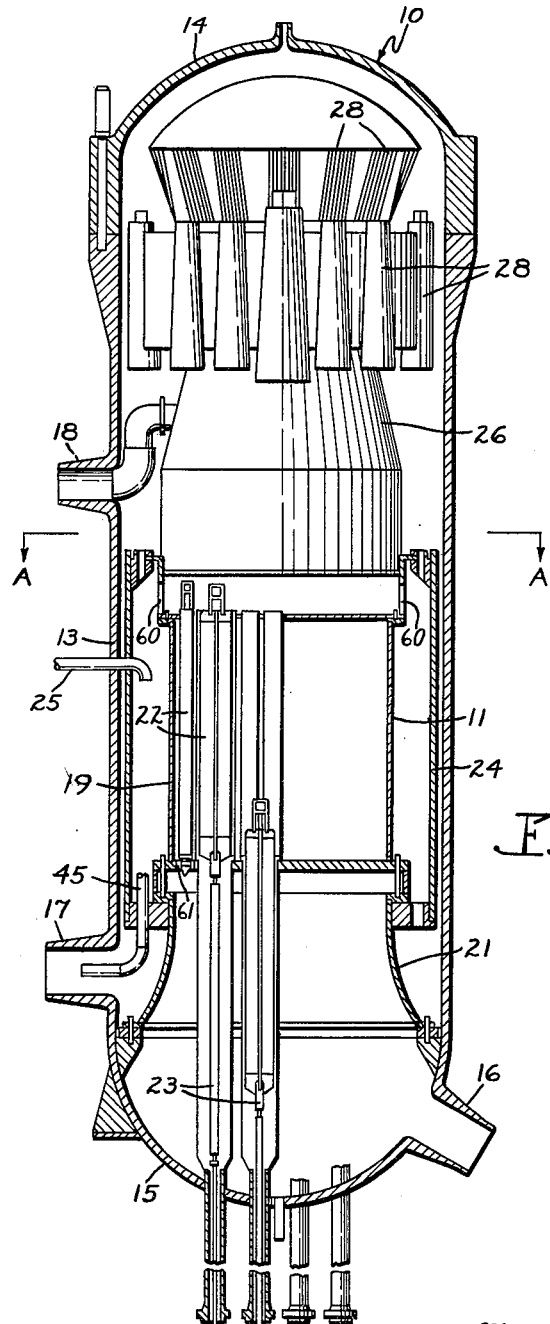
Figure 2:
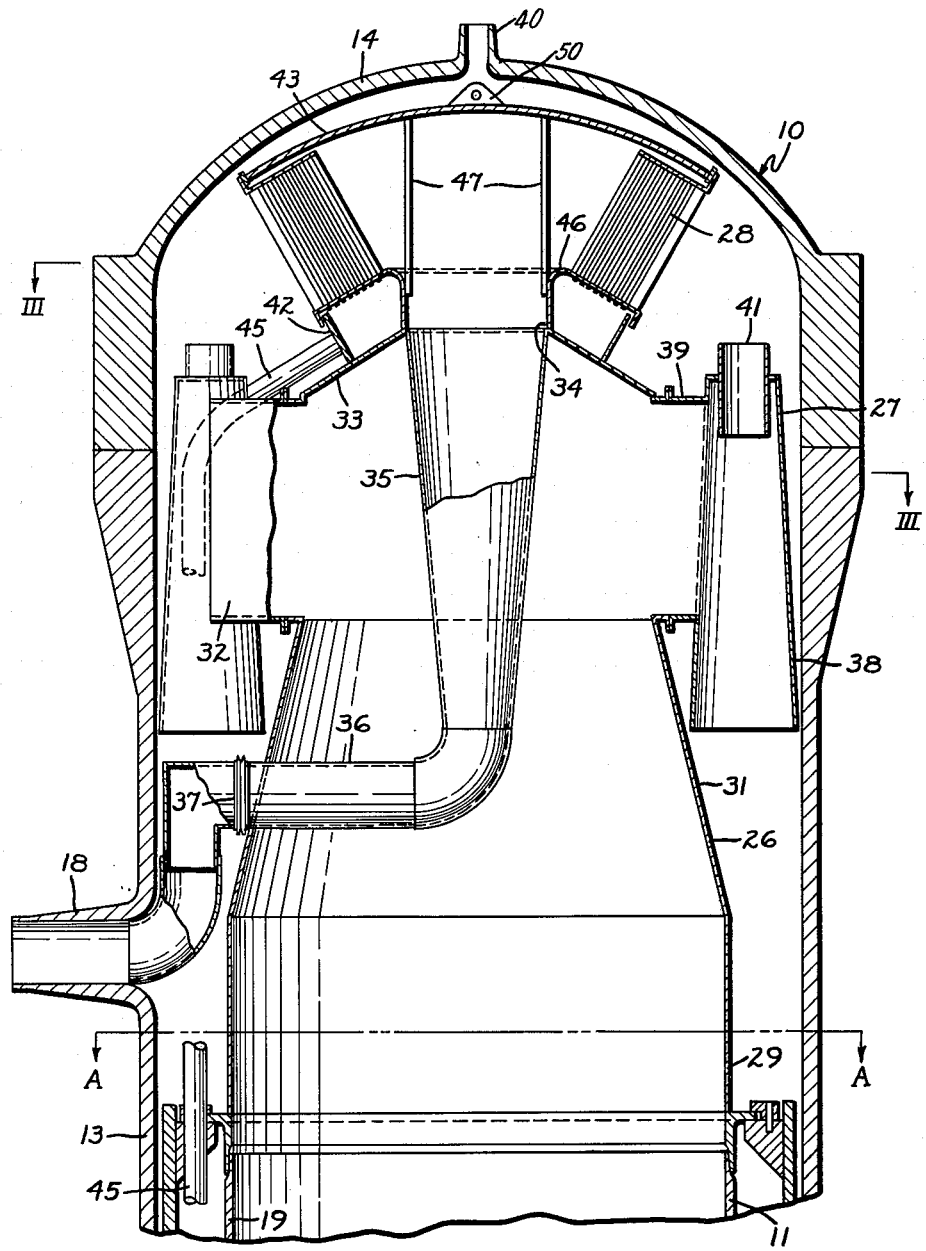
Figure 3:
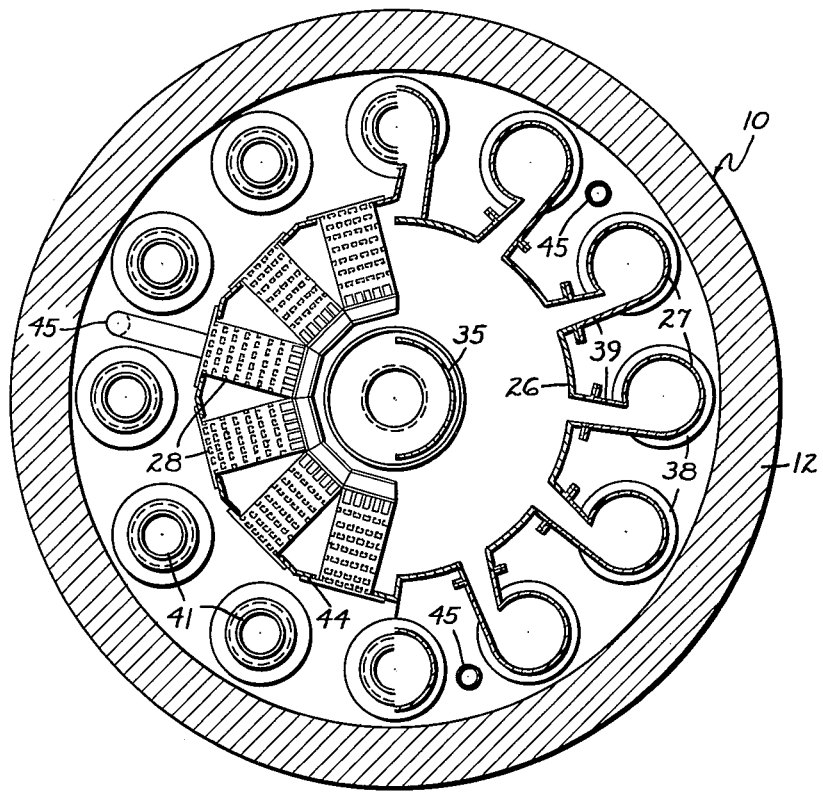

Although the novel features which are believed to be characteristic of this invention will be particularly pointed out in the claims appended hereto, the invention itself, as to its object and advantages, the mode of its operation, and the manner of its organization, may be better understood by referring to the following description taken in connection with the accompanying drawings forming a part thereof, in which:

FIGURE 1 is a vertical section view of a steam generating unit of the nuclear reactor type embodying the principles of the present invention, FIGURE 2 is an enlarged vertical sectional view of the upper portion of the apparatus shown in FIGURE 1, FIGURE 3 is a sectional view of the apparatus taken on the line III—III of FIGURE 2.

Referring first to FIGURE 1, wherein are best shown the general features of the invention, the steam separator, designated generally by the reference numeral 10, is shown in use in conjunction with a steam generating unit 11 of the nuclear reactor type. A housing 12 is provided having a tubular central portion 13 and hemispherical dome enclosures 14 and 15 at the ends thereof. At the lower end of the housing 12 is located a water entrance tube 16 and a water exit tube 17 adapted to be connected to a sump, not shown, and a circulating pump, also not shown; the housing 12 is also provided in the upper portion with a steam exit connection 18 which is adapted to be connected to the usual steam turbine or the like, not shown. In the lower part of the housing 12 is located a generating chamber 19 which is generally concentric with the tubular intermediate portion 13. The lower part of this chamber is connected to the upper portion of a skirt 21 which acts as a transition piece between the lower part of the chamber 19 and the sides of the housing adjacent the dome 15. The water inlet tube 16 opens into the chamber formed by the dome 15 and the skirt 21. The chamber 19 contains nuclear fuel elements 22 and through the dome 15 extend control rods 23 of the usual type. The control rods are provided with an adjusting means to permit their being moved in and out of the chamber 19 to control the reaction. The chamber 19, the skirt 21, the fuel elements 22 and the control rods 23 form an integral unit with the tubular structural members 24. Passage is left around the supporting members 19 for the passage of water from the upper part of the housing 12 to the water outlet 17. A makeup feed water tube 25 extends through the wall of the housing 12 into the water flow passage surrounding the chamber 19. At the upper part of the chamber 19 is mounted a steam release chamber 26 which is surrounded at its upper portion with steam separator elements 27 and which has mounted at its upper portion a series of drier cartons 28.

Referring now to FIGURES 2 and 3, which best show some of the details of the invention, it can be seen that the steam release chamber is provided with a lower tubular portion 29. To the top of this lower portion is attached a frustroconical portion 31 which, in turn, has mounted on its upper end a somewhat enlarged upper portion 32 of circular cross section which is closed at its upper end by a roof 33. The roof 33 is provided with a circular aperture 34 to which is fastened the upper end of a steam removal duct 35 which is of inverted frustoconical form and is attached at its lower end to a radially-extending pipe 36 which passes through the wall of the frusto-conical portion 31 of the steam release chamber and ultimately extends into and is fastened to the steam removal pipe 18. A suitable flexible joint 37 is provided in the pipe 36 to compensate for movement of the elements within the housing due to thermal expansion and the like. The steam separator elements 27 are grouped around the upper portion 32 of the steam release chamber and are generally elongated in the vertical direction, and extend a little above and a little below the portion 32. Each steam separator element 27 is provided with a frusto-conical skirt 38 which is larger at the bottom end and which has relatively little taper. Each element 27 is connected by a duct 39 to the upper portion 32 of the steam release chamber, Each skirt 38 is closed at its upper end but has a short pipe 41 extending therethrough axially of the skirt. The pipe extends a little above the skirt and extends downwardly within the skirt a short distance.

On the roof 33 of the upper portion 32 of the steam release chamber is mounted an annular drain chamber 42; above this and closely adjacent the dome 14 is a circular closure member 43. The cartons 28 extend between the drain chamber 42 and the closure 43 and are inclined upwardly and outwardly of the axis of the housing 12, as is evident in FIGURE 2. The drier cartons 28, as is usual practice, consist of a series of staggered baffle elements which cause a sinuous flow of steam therethrough. The wall 44 extends between the upper part of the drain chamber 42 and the closure 43 in those portions of its periphery which are not occupied by drier cartons 28. The baffle elements of the drier cartons 28 have access to the drain chamber 42 so that any water accumulating thereon may run into the chamber 42. The pipe 45 leaves a lower portion of the drainage chamber 42 and extends downwardly closely adjacent to the inner surface of the housing 12 and terminates in the water outlet tube 17, as is evident in FIGURE 1. A small vent outlet 40 is provided at the center of the dome 14, but this, of course, is normally closed during operation of the apparatus.

It should be noted that the inner surface of the annular drain chamber 42 is curved where it meets the duct 35 to form a venturi 46. Suitable support rods 47 extend between the drain chamber 42 and the closure 43 in the central portion thereof. A handling fixture 50 is welded to the top of the closure 43 to permit removal of the steam purifying elements in a body, the dome 14 being removable for this purpose. There are several drainage tubes 45 spaced around the drain chamber 42 to assure sufficient cross-sectional area to remove the amount of condensate which will accumulate in the chamber 42.

The operation of the apparatus will now be readily understood in view of the above description. The continuous circulation of water in the inlet pipe 16 and out through the water outlet pipe 17 takes place by means of a circulating pump located exteriorly of the apparatus. The flow takes place upwardly inside the skirt 21, through the chamber 19 around the fuel elements 22, laterally through apertures 60 above the chamber 19, and downwardly around the chamber 19 to the water outlet pipe 17. The flow from inside the skirt 21 to the chamber 19 takes place through apertures 61 in the plate dividing them. The generation of heat in the fuel elements 22 due to the nuclear reaction is controlled by means of the control rods 23 and acts to heat up the water being circulated. Steam is generated and rises from the upper surface of the water in the housing 12, the normal level of which is along the line A—A of FIGURE 1, that is to say, somewhere in the lower portion 27 of the steam release chamber 26. The steam rises through the steam release chamber up through the frusto-conical portion 31 into the upper portion 32. It then flows radially outwardly through the ducts 39 into the skirts 38 of the steam purifying elements 27. As is evident in FIGURE 3, the ducts 39 enter the skirt 38 tangentially so that the steam flow is in a circular direction and the heavy water particles and the like are thrown outwardy by centrifugal force against the surface of the skirt. The water which contacts the surface in this manner flows downwardly, leaves the bottom of the skirt, and flows back into the main body of water in the housing 12. The steam, being lighter, tends to occupy a central portion in the element 27 and leaves the element through the pipe 41. The steam leaving the element 27 then flows radially inwardly through the drier cartons 28 where further removal of impurities and water particles takes place. The water so removed flows downwardly along the elements of the drier carton into the drain chamber 42. From there, the water flows into the pipes 45 and into the normal flow of water at the water outlet pipe 17. The location of at least one of the pipes 45 co-axially of the water exit pipe 17 brings about an injector action which facilitates the removal of water from the drain chamber 42. The steam, after passing through the drier cartons 28, continues inwardly and then downwardly into the duct 35 through the opening 34 in the roof 33 of the upper portion 32 of the steam release chamber. As has been stated, the inner portion of the drain chamber 42 is curved to form a venturi section 46 to facilitate this entrance. The steam moves downwardly through the duct 35 into the pipe 36 and out through the steam outlet pipe 18 for use in a turbine or the like.

Certain novel features have been shown and described and are pointed out in the annexed claims. It will be understood that various omissions, substitutions and changes in the forms and details of the device illustrated and in its operation may be made by those skilled in the art without departing from the spirit of the invention.

The invention having been thus described, what is claimed as new and desired to secure by Letters Patent is:

1. A steam separator for use with a steam generating unit having a substantial circulation of water, comprising an elongated, vertical, tubular housing, a hemi-spherical dome closing the upper end of the housing and having a separable junction therewith, a steam release chamber of circular cross-section arranged centrally of the housing below the dome, a series of centrifugal separater elements arranged around the periphery of the chamber, each element having an entrance passage opening into the chamber, each element having a downwardly-directed water exit and an upwardly-directed steam exit, a steam removal duct having an entrance adjacent the dome and extending vertically through the said chamber centrally thereof, the duct leaving the chamber in the lower portion thereof and extending out of the housing at a portion thereof substantially separated from the said junction, a series of drier cartons and associated baffles arranged in a circle around the entrance to the said duct and affording the only passage from the steam exit of the said element to the said entrance to the duct, an annular drain chamber underlying the series of drier cartons and open thereto to collect moisture therefrom, means forming an exit passage located in the steam generating unit, means insuring a substantial flow of water therein, and a pipe connected at one end to the drain chamber and having its other end extending into the said exit passage, the said other end of the pipe being directed in the direction of water flow in the said passage to produce ejector action therein.

2. A steam separator, comprising an elongated, vertical, tubular housing, a hemi-spherical dome closing the upper end of the housing and having a separable junction therewith, a steam release chamber of circular cross-section arranged centrally of the housing below the dome, a series of centrifugal separator elements having frusto-conical skirts arranged around the periphery of the chamber, each element having an entrance passage opening into the chamber, each element having a downwardly-directed water exit at the large end of the skirt and an upwardly-directed steam exit at the small end of the skirt, the steam exit having a pipe that extends into the skirt a substantial distance, a steam removal duct having an entrance adjacent the dome and extending vertically through the said chamber centrally thereof, the duct having a generally frusto-conical portion with its large end uppermost, the duct leaving the chamber in the lower portion thereof and extending out of the housing at a portion thereof substantially separated from the said junction, a series of drier cartons and associated baffles arranged in a circle around the said large end of the said duct and providing the only passage from the steam exit of the said elements to the said entrance of the duct.

3. A steam generating unit of the circulating-water type, comprising an elongated, vertical, tubular housing, a hemi-spherical dome closing the upper end of the housing and having a separable junction therewith, a steam release chamber of circular cross-section arranged centrally of the housing below the dome, the chamber having a frusto-conical portion in the lower part thereof which has its small end uppermost and which overlies a normal level of water in the steam generating unit, a series of centrifugal separator elements arranged around the periphery of the chamber, each element having an entrance passage opening into the chamber, each element having a downwardly-directed water exit and an upwardly-directed steam exit, a steam removal duct having a venturi-shaped entrance portion adjacent the dome and extending vertically through the said chamber centrally thereof, the duct leaving the chamber in the lower portion thereof and extending out of the housing at a portion thereof substantially separated from the said junction, a series of drier cartons and associated baffles arranged in a circle around the entrance to the said duct and affording the only passage from the steam exit of the said elements to the said entrance to the duct.

4. A steam generating unit having a substantial circulation of water, comprising an elongated, vertical, tubular housing, a hemispherical dome closing the upper end of the housing and having a separable junction therewith, a steam release chamber of circular cross-section arranged centrally of the housing below the dome, the chamber having a frusto-conical portion in the lower part thereof which has its small end uppermost and which overlies a normal level of water in the steam generating unit, a series of centrifugal separator elements having frusto-conical skirts arranged around the periphery of the chamber, each element having an entrance passage opening into the chamber, each element having a downwardly-directed water exit at the large end of the skirt and an upwardly-directed steam exit at the small end of the skirt, the steam exit having a pipe that extends into the skirt a substantial distance, a steam removal duct having a venturi-shaped entrance portion adjacent the dome and extending vertically through the said chamber centrally thereof, the duct having a generally frusto-conical portion with its large end uppermost, the duct leaving the chamber in the lower portion thereof and extending out of the housing at a portion thereof substantially separated from the said junction, a series of drier cartons and associated baffles arranged in a circle around the entrance to the said duct and affording the only passage from the steam exit of the said elements to the said entrance to the duct, an annular drain member underlying the series of drier cartons and open thereto to collect moisture therefrom, means forming an exit passage located in the steam generating unit, means insuring a substantial flow of water therein, and a pipe connected at one end to the drain chamber and having its other end extending into the said exit passage, the said other end of the pipe being directed in the direction of water flow in the said passage to produce an ejector action therein.

References Cited in the file of this patent
UNITED STATES PATENTS

| | | |
|---|---|---|
| 2,216,369 | Jeffords | Oct. 1, 1940 |
| 2,402,154 | Fletcher | June 18, 1946 |
| 2,511,387 | Watson et al. | June 13, 1950 |
| 2,604,082 | Coulbourn | July 22, 1952 |
| 2,822,060 | Udovich | Feb. 4, 1958 |
| 2,840,050 | Sprague et al. | June 24, 1958 |
| 2,845,906 | Gram | Aug. 5, 1958 |
| 2,862,479 | Blaser et al. | Dec. 2, 1958 |

FOREIGN PATENTS

| | | |
|---|---|---|
| 723,086 | Great Britain | Feb. 2, 1955 |